(Model.)

J. SELBY.
CORN PLANTER.

No. 274,981. Patented Apr. 3, 1883.

Witnesses:
H. H. Wells.
Rich'd. A. Goldsbrough.

Inventor,
James Selby,
per A. B. Upham,
Attorney in fact.

UNITED STATES PATENT OFFICE.

JAMES SELBY, OF PEORIA, ILLINOIS.

CORN-PLANTER.

SPECIFICATION forming part of Letters Patent No. 274,981, dated April 3, 1883.

Application filed November 3, 1882. (Model.)

*To all whom it may concern:*

Be it known that I, JAMES SELBY, of Peoria, in the county of Peoria, in the State of Illinois, have invented an Improvement in Corn-Planters; and I do hereby declare that the following is a full, clear, and exact description thereof, reference being had to the annexed drawings, making a part of this specification, in which like letters of reference refer to like parts, and in which—

Figure 1:
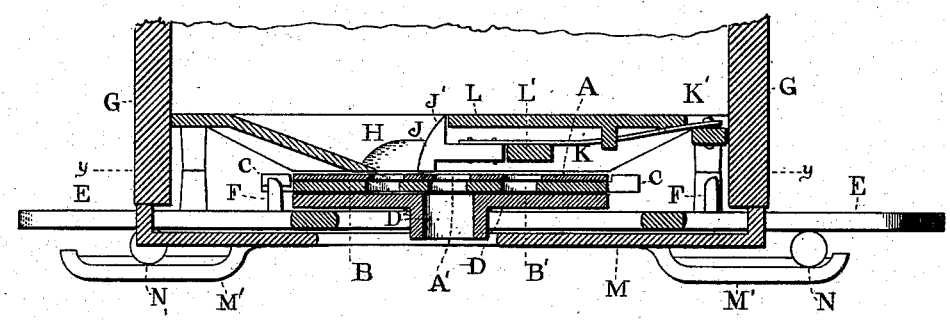
Figure 2:
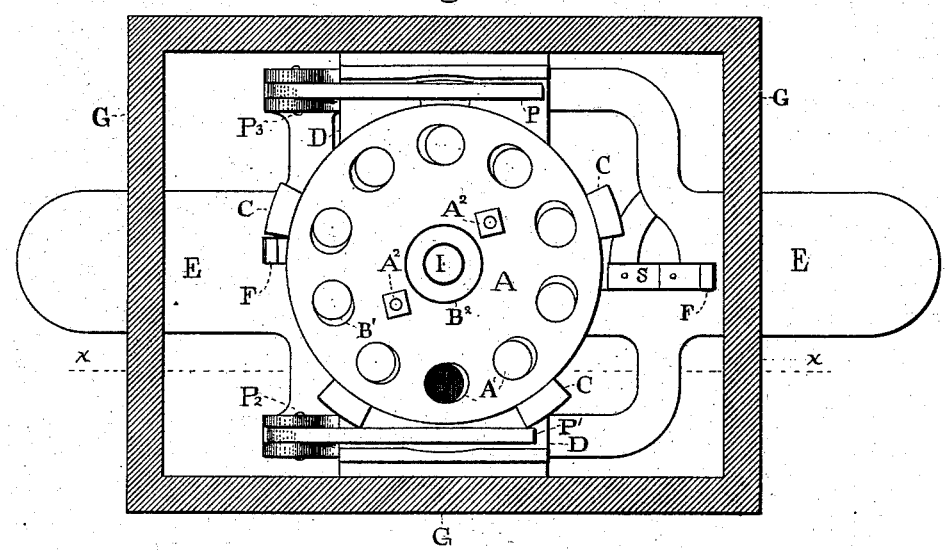

Figure 1 represents a vertical section through $x\ x$; Fig. 2, a sectional plan through $y\ y$.

My invention is in that class of corn-planters in which a horizontal disk containing openings therethrough is secured in the bottom of the seed-box, and, being intermittently rotated by means of gravity-pawls engaging with lugs at the circumference of said disk and pivoted to a horizontally-reciprocating bar, controls the dropping of the corn from said seed-box.

My improvement relates to the means of intermittently rotating the perforated disk, to the stopping of said disk after each movement, and to the shut-off beneath which is the seed-opening through the bottom of the seed-box, whereby no more corn is allowed to pass downward than is in any one of the disk-perforations.

In the drawings, G is the seed-box; A B, the disk, having openings A' B'; P P', the gravity-pawls, pivoted at $P^2$ and $P^3$ to arms extending laterally from the slide-bar E. H L is the bottom of the seed-box, and has through it a three-fourths annular opening, beneath which come the perforations of the disk A B. This bottom H L is not shown in plan in the drawings, but only in vertical section in Fig. 1.

My disk A B, I make in two parts, A and B, each of which has the same number—usually ten—of transradially-elongated openings A' and B'. The upper thin disk, A, is rotative about a central projecting boss, $B^2$, of the disk B, and is bound to said disk B by the small bolts $A^2$. This is for the purpose of allowing the size of the openings A' B' to be changed to suit different kinds of corn by turning slightly the one upon the other to bring the opposite sides of any two of said openings toward or from each other. The bolt-holes in one of the thin disks, being elongated, permit this adjustability. This disk A B rests upon the transverse plate D, and is held in place thereon by the pin I, projecting through the center of the said disk A B. Said plate D is entirely plane on its upper surface, but has one opening, $D^2$, through which the corn held in any disk-opening A' B' above it can descend to the heel of the planter-shoe. From the under disk, B, project radially five lugs, the upper faces of which all slope in the same direction to permit the pawls P P' to slide up over them the more readily. Although the pawls are pivoted at $P^2$ and $P^3$ toward the same end of the slide-bar E, they are enabled to rotate the disk A B in the same direction by making one of them a push-pawl, P, and the other a pull-pawl, P', being hook-shaped.

To prevent the disk A B from being turned too far, a stop-lug, F, is fastened to the slide-bar E at each side of the disk A B, at such a point that each slide of the bar E brings one of said stops F immediately in front of one of the lugs C, as soon as the disk A B has been moved by one of the pawls P. If, however, through any cause, the slide-bar E is not moved far enough, the disk A B will be so left that one of the lugs C lies directly in the path of one of the stops F at the next movement of the bar E, and something would have to break. To remedy this I have the said stops F vertically movable in slots cut through the bar E and pressed up in position by springs S. Now, if the said lugs C are in the way of one of the stops F the latter is simply pushed downward, or, if the other construction be used, backward, and no injury is done. The slide-bar E rests upon rollers N N, supported by the tracks M' M', depending from the skeleton frame M.

The bottom H L, below which is the disk A B and other mechanism just described, has through it, as previously mentioned, an annular opening concentric with the disk A B. Said opening does not make an entire circle, but only about three-fourths of one, and is at the same distance from the center of the disk A B as are the openings A' B', so that all of said openings A' B' are uncovered to the corn in the seed-box, except the one or two beneath the solid one-fourth part that makes up the remainder of the three-fourths annular opening aforesaid. This said one-fourth part is directly over the opening D² through the plate D, and operates, of course, to prevent more corn dropping through an opening A' B', which comes thereunder, than is contained in said A' B'.

To prevent any grains of corn which may project partially upward from the others contained in A' B', from being cut in two as the revolution of the disk A B carries them under the edge of the said solid one-fourth part, I have constructed a hammer-shaped cut-off, J, held down almost against the disk A B by a spring, K, and kept from touching said disk by the stop L'. The said solid one-fourth part or bridge L, beneath which is placed said cut-off J, is elevated sufficiently to allow the requisite vertical play of said cut-off J. The object of the arm J' of the cut-off J is to prevent the admission of grain into the space between the said cut-off J and the bridge L. It will be observed that this construction of the cut-off J is free from the serious defect of becoming clogged by any grain of corn getting crowded between it and any part of the bridge L. Were the bridge L in the form of an inverted cup up into which a flat cut-off could be pressed a grain of corn could easily get crowded between it and the overhanging cup-edge of the bridge and entirely stop the correct workings of the machine.

What I claim as my invention, and for which I desire Letters Patent, is as follows, to wit:

1. In combination with a corn-planter seed-box bottom, H, having partial annular opening, as described, the flat elevated bridge L, and the hammer-shaped cut-off J, having spring K, substantially as and for the purpose specified.

2. In a seed-dropping mechanism for corn-planters, a disk-stop, F, secured to the slide-bar E, and adapted to offer resistance to transverse but not to longitudinal pressure relative to said slide-bar, for the purpose set forth.

3. The compound disk A B, having perforations A' B', and radially-projecting lugs C, in combination with the gravity-pawls P P', pivoted to the slide-bar E, substantially as and for the purpose specified.

4. The two disks A and B, having radially-projecting lugs C, and transversely-elongated openings A' B', and bolts A², in combination with the supporting-plate D, the slide-bar E, having depressible stops F, and the gravity push and pull pawls P P', substantially as and for the purpose described.

5. In corn-planter seed-dropping mechanism, the bottom, H, having partial annular opening and elevated bridge L, and the hammer-shaped spring-actuated cut-off J, in combination with the perforated disk A B, having lugs C, the gravity push and pull pawls P P', and the slide-bar E, having spring-stops F, substantially as and for the purpose herein set forth.

In testimony that I claim the foregoing invention I have hereunto set my hand this 21st day of October, 1882.

JAMES SELBY.

Witnesses:
 H. W. WELLS,
 RICHD. A. GOLDSBROUGH.